US010545654B2

(12) United States Patent
Meehan

(10) Patent No.: US 10,545,654 B2
(45) Date of Patent: *Jan. 28, 2020

(54) SYSTEMS AND METHODS FOR SELECTING PORTIONS OF MEDIA FOR A PREVIEW

(71) Applicant: Apple Inc., Cupertino, CA (US)

(72) Inventor: Kenneth C. Meehan, Redwood, CA (US)

(73) Assignee: APPLE INC., Cupertino, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/230,577

(22) Filed: Dec. 21, 2018

(65) Prior Publication Data
US 2019/0121528 A1 Apr. 25, 2019

Related U.S. Application Data

(63) Continuation of application No. 14/335,636, filed on Jul. 18, 2014, now Pat. No. 10,162,506.

(51) Int. Cl.
G06F 3/0484 (2013.01)
H04N 21/8547 (2011.01)
(Continued)

(52) U.S. Cl.
CPC .......... G06F 3/04847 (2013.01); G11B 27/00 (2013.01); G11B 27/031 (2013.01); G11B 27/34 (2013.01); H04N 21/8547 (2013.01); H04N 21/8549 (2013.01); G06F 3/0484 (2013.01); G06F 3/0488 (2013.01)

(58) Field of Classification Search
CPC ........ G06F 3/041; G06F 3/048; G06F 3/0481; G06F 3/04817; G06F 3/0482; G06F 3/0484; G06F 3/04842; G06F 3/04845; G06F 3/04847; G06F 3/0488; G06F 3/01; G06F 3/017; G06F 3/14; G06F 9/4443;
(Continued)

(56) References Cited

U.S. PATENT DOCUMENTS 6,249,280 B1 6/2001 Garmon et al.
6,892,353 B1 5/2005 Ubillos
(Continued)

FOREIGN PATENT DOCUMENTS

EP 0916136 B1 3/2003
EP 1326248 A2 7/2003
(Continued)

OTHER PUBLICATIONS

Adobe Audition Help—Selecting Audio; https://helpx.adobe.com/audition/using/selecting-audio.html; 4 pgs.
(Continued)

Primary Examiner — Xiomara L Bautista
(74) Attorney, Agent, or Firm — Fletcher Yoder PC

(57) ABSTRACT

The present disclosure relates to selecting individual tracks within a time-based media for playback. In certain embodiments, an adjustable playhead spans the tracks that a user desires to include in the preview. In one such implementation, the user may adjust the position of handles on the playhead such that the playhead spans the desired tracks. Playback using the playhead may play a preview of those tracks spanned by the playhead.

20 Claims, 11 Drawing Sheets

(51) Int. Cl.
*H04N 21/8549* (2011.01)
*G11B 27/031* (2006.01)
*G11B 27/34* (2006.01)
*G11B 27/00* (2006.01)
*G06F 3/0488* (2013.01)

(58) Field of Classification Search
CPC .. G11B 27/034; G11B 27/34; H04N 5/44543; H04N 21/4622; H04N 21/482
See application file for complete search history.

(56) References Cited

U.S. PATENT DOCUMENTS

| | | | |
|---|---|---|---|
| 7,434,155 B2 | 10/2008 | Lee | |
| 7,770,117 B1 | 8/2010 | Uy et al. | |
| 7,818,658 B2 | 10/2010 | Chen | |
| 7,827,489 B2 | 11/2010 | Ubillos | |
| 7,954,065 B2 | 5/2011 | Ubillos | |
| 7,984,385 B2 | 7/2011 | Ubillos | |
| 7,992,097 B2 | 8/2011 | Ubillos | |
| 8,020,100 B2 | 9/2011 | Ubillos et al. | |
| 8,244,103 B1 | 8/2012 | Shore | |
| 8,473,846 B2 | 6/2013 | Ubillos et al. | |
| 8,559,793 B2 | 10/2013 | Wallace | |
| 8,631,047 B2 | 1/2014 | Roenning | |
| 8,701,007 B2 | 4/2014 | Meaney et al. | |
| 2005/0183013 A1 | 8/2005 | Ubillos | |
| 2005/0216839 A1 | 9/2005 | Salvucci | |
| 2006/0224940 A1 | 10/2006 | Lee | |
| 2008/0152297 A1 | 6/2008 | Ubillos | |
| 2008/0152298 A1 | 6/2008 | Ubillos | |
| 2008/0152299 A1 | 6/2008 | Ubillos | |
| 2008/0155413 A1 | 6/2008 | Ubillos | |
| 2008/0155420 A1 | 6/2008 | Ubillos et al. | |
| 2008/0155421 A1 | 6/2008 | Ubillos et al. | |
| 2008/0155459 A1 | 6/2008 | Ubillos | |
| 2010/0281367 A1* | 11/2010 | Langmacher ....... G06F 3/04847 715/716 | |
| 2010/0281376 A1 | 11/2010 | Meaney et al. | |
| 2011/0289413 A1 | 11/2011 | Ubillos et al. | |
| 2011/0314379 A1 | 12/2011 | Ubillos | |
| 2012/0207452 A1 | 8/2012 | Wang et al. | |
| 2012/0210221 A1 | 8/2012 | Khan et al. | |
| 2012/0210228 A1 | 8/2012 | Wang et al. | |
| 2012/0210230 A1 | 8/2012 | Matsuda et al. | |
| 2012/0210231 A1 | 8/2012 | Ubillos et al. | |
| 2012/0210232 A1 | 8/2012 | Wang et al. | |
| 2013/0124999 A1 | 5/2013 | Agnoli et al. | |

FOREIGN PATENT DOCUMENTS

| | | |
|---|---|---|
| EP | 1376406 A2 | 1/2004 |
| EP | 1557836 A2 | 7/2005 |
| EP | 2172936 A2 | 4/2010 |
| EP | 2581912 A1 | 4/2013 |
| WO | 0177880 A2 | 10/2001 |
| WO | 2006107804 A2 | 10/2006 |
| WO | 2007035317 A2 | 3/2007 |
| WO | 2007072467 A2 | 6/2007 |
| WO | 2007112447 A2 | 10/2007 |
| WO | 2008011243 A2 | 1/2008 |
| WO | 2008060655 A2 | 5/2008 |
| WO | 2008079567 A2 | 7/2008 |
| WO | 2008079568 A2 | 7/2008 |
| WO | 2008079587 A2 | 7/2008 |
| WO | 2011097243 A2 | 8/2011 |
| WO | 2012027270 A1 | 3/2012 |
| WO | 2013074207 A1 | 5/2013 |
| WO | 2013142966 A1 | 10/2013 |

OTHER PUBLICATIONS

Logic Pro 9 User Manual: Setting the Playhead Position; https://documentation.apple.com/en/logicpro/usermanual/index.html; 4pgs.
Logic Pro 9 User Manual: Zooming the Working Area; https://documentation.apple.com/en/logicpro/usermanual/index.html; 6 pgs.
The Avid Assistant—Editors Handbook; http://avidassteditor.com/avid-tips/timeline-tips/; 3 pgs.

* cited by examiner

SYSTEMS AND METHODS FOR SELECTING PORTIONS OF MEDIA FOR A PREVIEW

CROSS-REFERENCE TO RELATED APPLICATIONS

This application is a continuation of U.S. application Ser. No. 14/335,636, filed Jul. 18, 2014, entitled "Systems and Methods for Selecting Portions of Media for a Preview," which is incorporated herein by reference in its entirety.

BACKGROUND

The present disclosure relates generally to editing and producing time-based media. Specifically, the embodiments described herein relate to systems and methods for selecting portions of time-based media to play in a preview.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

In application programs for editing and producing time-based media, the user interface may present a visual depiction of the different tracks of graphics, text, video, and sound that will be included in the media. For example, in a video editing program, the user interface may present the different tracks for video, graphics, and text that will be overlaid as a single image and the different tracks for sound. The user interface may also include a variety of menus, radio buttons, checkboxes, and the like to control and edit the different tracks.

The media-application may also include a preview mode, which allows a user to view or listen to a preview of the media in its current state. In particular, the user can utilize the preview mode to evaluate recent changes made to the media without making the changes permanent (i.e., saving the changes). Accordingly, the preview mode reduces the complexity of the editing process, as the user does not have to create several copies of the media with various changes to evaluate different editing decisions. Further, if a significant amount of time is necessary to compile the media file, then eliminating the need for the user to create several copies of the media may reduce the time required for the editing process.

In certain situations, the user may want to preview only a portion of the tracks. For instance, the user may want to preview only one video track and one audio track to ensure that the two tracks are properly synchronized. In another example, the user may wish to only view video tracks to determine if certain aspects of the videos (e.g., white or color balance, exposure, etc.) are consistent throughout the compiled video. However, the media-editing application may limit how a user selects which portions of a media to include in a preview. For instance, the application may take an "all or nothing" approach, in which all tracks of a particular type of track are either included, or not. Other media-editing applications may involve individually selecting the tracks to include in or exclude from the preview using menus within the user interface. Further, some media-editing applications may not allow users to select only a portion of the media to include in a preview.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

This disclosure relates to application programs for editing and producing media that include a preview mode, which allows users to quickly evaluate any edits to a media without making any permanent changes to the media file. At times, it may be desirable to preview only a portion of the media (e.g., only preview the audio tracks for a video). The present embodiments disclosed herein relate to selecting a portion of a media to preview using a media-editing application. Specifically, the embodiments include an adjustable playhead used in applications for editing time-based media. The configuration of the adjustable playhead determines which portions of the time-based media are included in a preview of the time-based media. In particular, only the portions of the time-based media spanned by the adjustable playhead are included in a preview. Adjusting the configuration of the playhead may be comfortable to users because a playhead may be a familiar feature within a user interface for the application program. Thus, selecting the desired portions of the time-based media may be less complicated than navigating menus, which may be minimized or removed from the user interface, to accomplish the same task. Further, by using the adjustable playhead, the user may control the portions of the media included in the preview at multiple levels of granularity.

The embodiments also include generating multiple playheads and rejoining playheads within a media-editing application. As will be appreciated, certain media-editing applications may restrict the spatial arrangement or depiction of the various components of a time-based media. For example, the media-editing application may present the different tracks of a time-based media in a particular order that the user is unable to alter. In another instance, the user may arrange the user interface to present the components of the time-based media in a particular manner that he or she does not wish to change. In such situations, the user may generate multiple playheads to select portions of the time-based media that are not adjacent to one another within the user interface. The user may also rejoin playheads as desired.

Further, the user may also perform other control and editing actions on the portions of the time-based media spanned by the adjustable playhead. For example, the user may edit the selected portions of the time-based media as a group or may save the selected portions as a preset for later reference. As mentioned above, performing such actions using the adjustable playhead may be easier than navigating menus to accomplish the same task.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Further, the terms "application program," "application," and "program" are intended to encompass any processor-executable instructions (e.g., an operating system, a web application, etc.).

This disclosure is generally directed towards previewing a portion of a time-based media within a media-editing application. In a certain embodiment, the configuration of a playhead within the media-editing application determines which portions of the time-based media are included in a preview of the media. A user may change the configuration of the playhead and, subsequently, the portions of the media included in the preview, as desired. The media-editing application may also support multiple playheads as necessary based on the depiction and spatial arrangement of the components of the time-based media. Further, the media editing application may allow the user to perform other actions (e.g., save, edit, etc.) on the portions of the time-based media designated by the playhead for preview mode.

Figure 1:
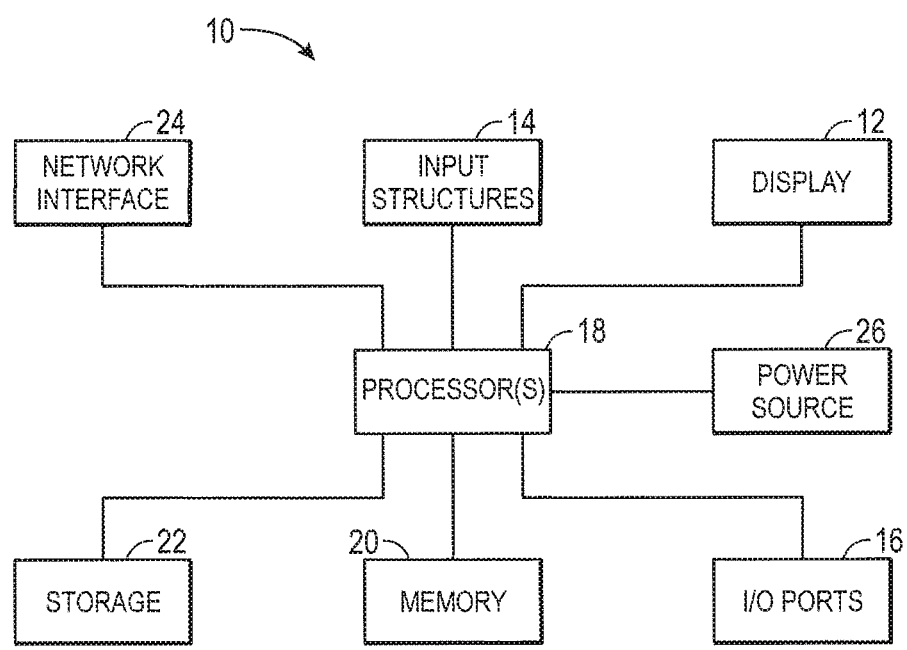
FIG. 1 is a block diagram of an electronic device that may use the techniques disclosed herein, in accordance with an embodiment.

Turning first to FIG. 1, an electronic device 10 may include, among other things, a display 12, input structures 14, input/output (I/O) ports 16, one or more processor(s) 18, memory 20, nonvolatile storage 22, a network interface 24, and a power source 26. The various functional blocks shown in FIG. 1 may include hardware elements (including circuitry), software elements (including computer code stored on a non-transitory computer-readable medium) or a combination of both hardware and software elements. It should be noted that FIG. 1 is merely one example of a particular implementation and is intended to illustrate the types of components that may be present in the electronic device 10. Indeed, the various depicted components (e.g., the processor(s) 18) may be separate components, components of a single contained module (e.g., a system-on-a-chip device), or may be incorporated wholly or partially within any of the other elements within the electronic device 10. The components depicted in FIG. 1 may be embodied wholly or in part as machine-readable instructions (e.g., software or firmware), hardware, or any combination thereof.

Figure 2:
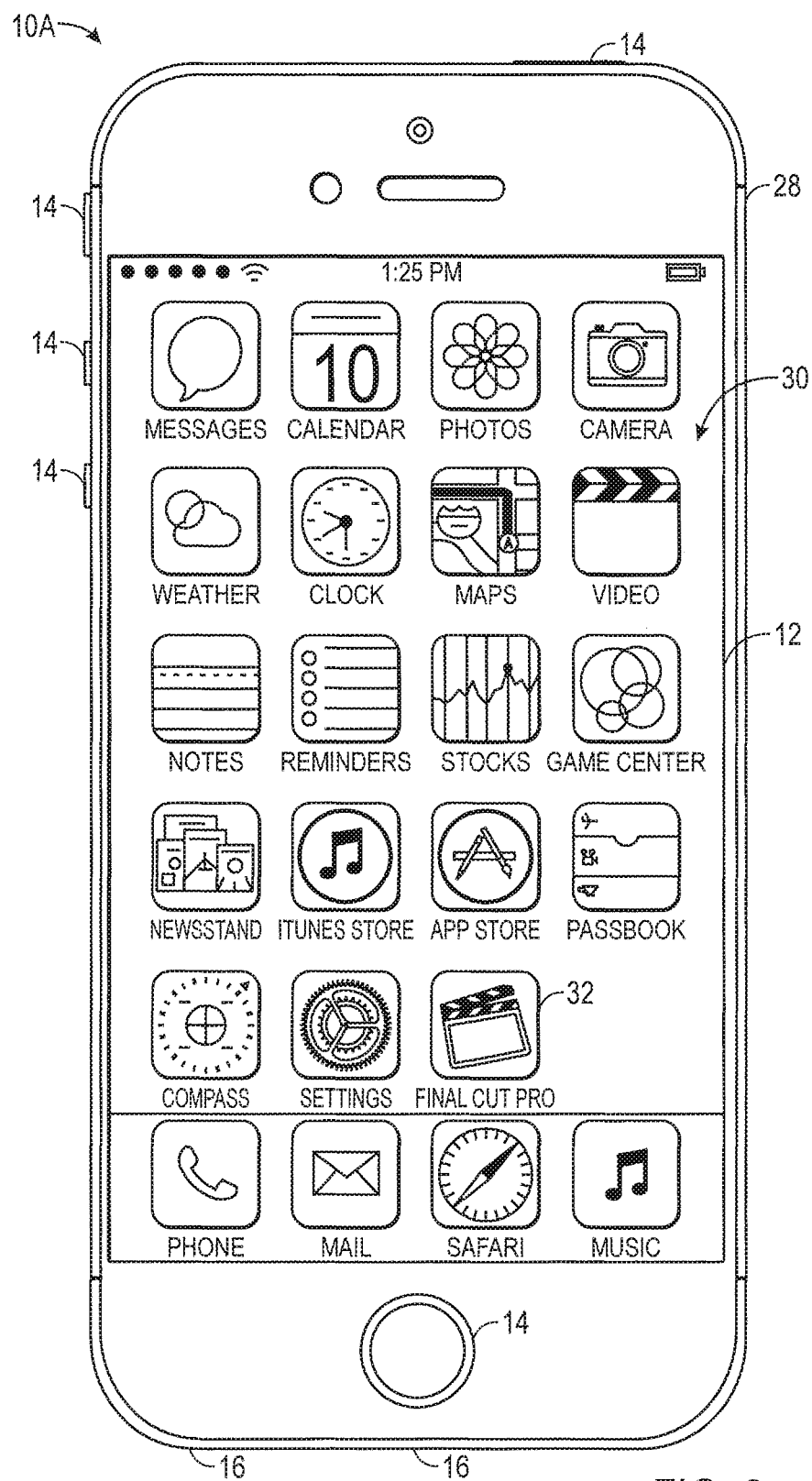
FIG. 2 is a front view of a handheld device, such as an iPhone® by Apple Inc., in accordance with an embodiment.
Figure 3:
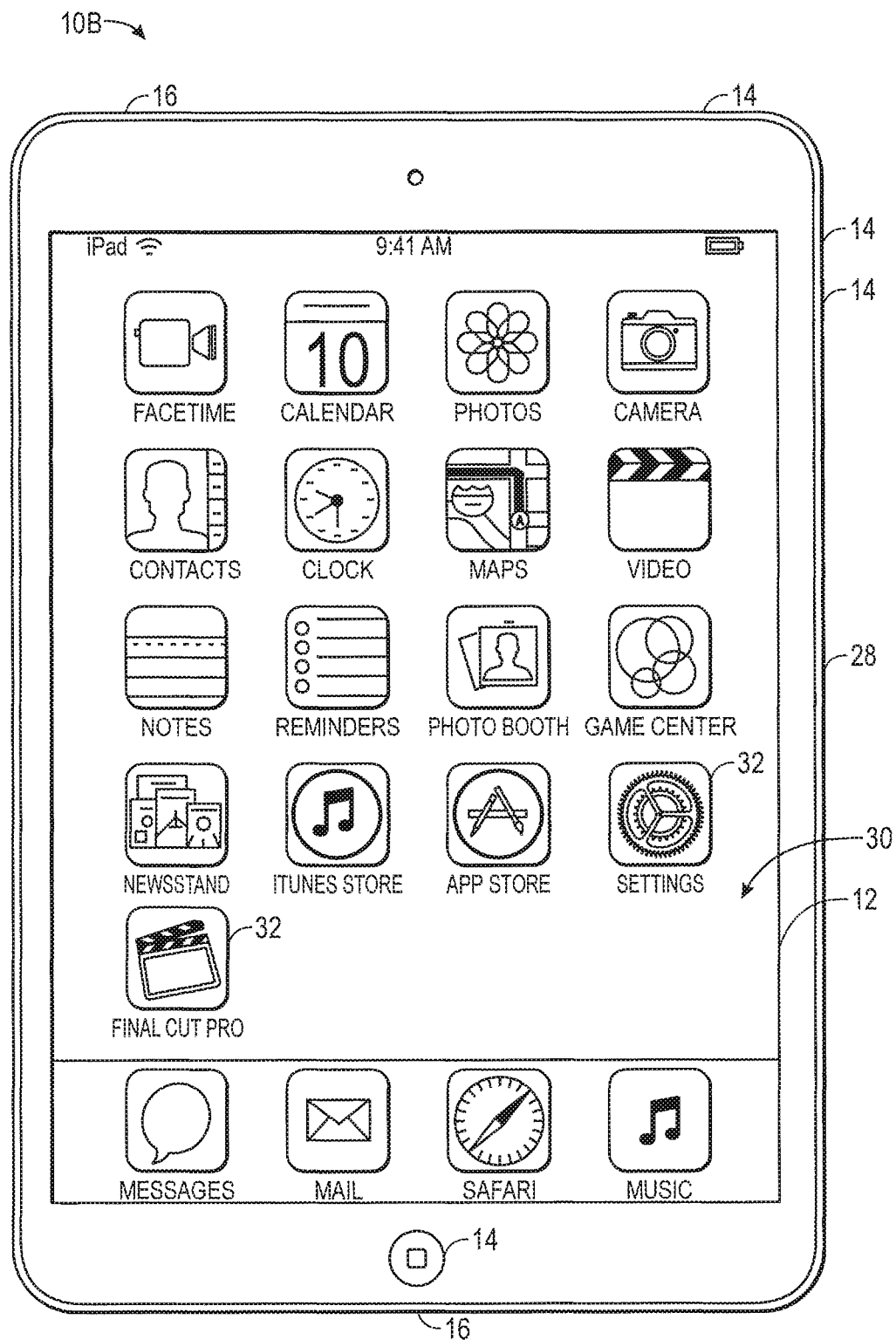
FIG. 3 is a front view of a tablet device, such as an iPad® by Apple Inc., in accordance with an embodiment.
Figure 4:
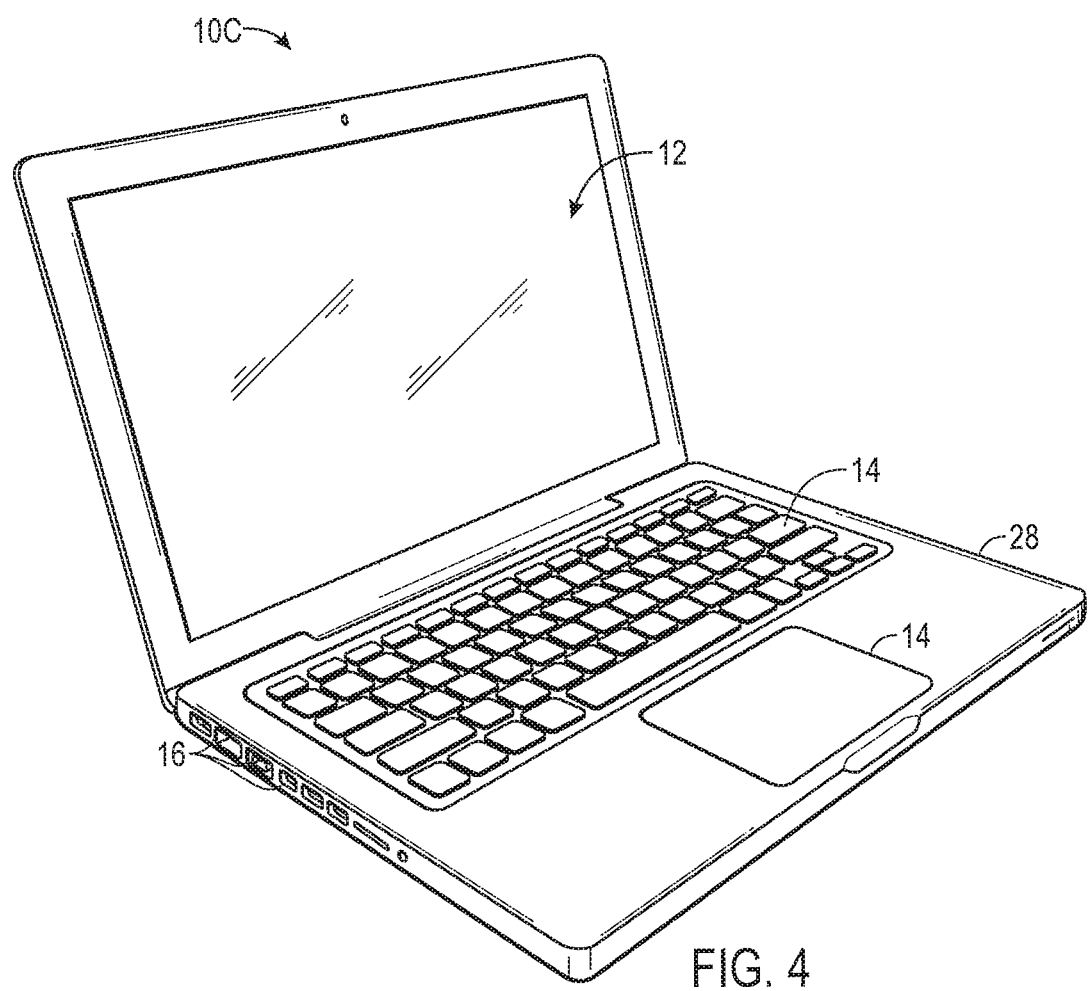
FIG. 4 is a perspective view of a notebook computer, such as a MacBook Pro® by Apple Inc., in accordance with an embodiment.

By way of example, the electronic device 10 may represent a block diagram of the handheld device depicted in FIG. 2, the tablet computing device depicted in FIG. 3, the notebook computer depicted in FIG. 4, or similar devices, such as desktop computers, televisions, and so forth. In the electronic device 10 of FIG. 1, the display 12 may be any suitable electronic display used to display image data (e.g., a liquid crystal display (LCD) or an organic light emitting diode (OLED) display). In some examples, the display 12 may represent one of the input structures 14, enabling users to interact with a user interface of the electronic device 10. In some embodiments, the electronic display 12 may be a MultiTouch™ display that can detect multiple touches at once. Other input structures 14 of the electronic device 10 may include buttons, keyboards, mice, trackpads, and the like. The I/O ports 16 may enable electronic device 10 to interface with various other electronic devices.

The processor(s) 18 and/or other data processing circuitry may execute instructions and/or operate on data stored in the memory 20 and/or nonvolatile storage 22. The memory 20 and the nonvolatile storage 22 may be any suitable articles of manufacture that include tangible, non-transitory computer-readable media to store the instructions or data, such as random-access memory, read-only memory, rewritable flash memory, hard drives, and optical discs. By way of example, a computer program product containing the instructions may include an operating system (e.g., OS X® or iOS by Apple Inc.) or an application program (e.g., Aperture®, Final Cut Pro X®, Logic Pro X®, or iMovie® by Apple Inc.) or a suite of such application programs (e.g., Final Cut Studio® by Apple Inc.).

The network interface 24 may include, for example, one or more interfaces for a personal area network (PAN), such as a Bluetooth network, for a local area network (LAN), such as an 802.11x Wi-Fi network, and/or for a wide area network (WAN), such as a 4G or LTE cellular network. The power source 26 of the electronic device 10 may be any suitable source of energy, such as a rechargeable lithium polymer (Li-poly) battery and/or an alternating current (AC) power converter.

As mentioned above, the electronic device 10 may take the form of a computer or other type of electronic device. Such computers may include computers that are generally portable (such as laptop, notebook, and tablet computers) as well as computers that are generally used in one place (such as conventional desktop computers, workstations and/or servers). FIG. 2 depicts a front view of a handheld device 10A, which represents one embodiment of the electronic device 10. The handheld device 10A may represent, for example, a portable phone, a media player, a personal data organizer, a handheld game platform, or any combination of such devices. By way of example, the handheld device 10A may be a model of an iPod® or iPhone® available from Apple Inc. of Cupertino, Calif.

The handheld device 10A may include an enclosure 28 to protect interior components from physical damage and to shield them from electromagnetic interference. The enclosure 28 may surround the display 12, which may display a graphical user interface (GUI) 30 having an array of icons 32. By way of example, one of the icons 32 may launch a video editing application (e.g., Final Cut Pro X® or iMovie® by Apple Inc.), an image editing application (e.g., Aperture® by Apple Inc.), or a music editing application (e.g., Logic Pro X® by Apple Inc.). User input structures 14, in combination with the display 12, may allow a user to control the handheld device 10A. For example, the input structures 14 may activate or deactivate the handheld device 10A, navigate a user interface to a home screen, navigate a user interface to a user-configurable application screen, activate a voice-recognition feature, provide volume control, and toggle between vibrate and ring modes. Touchscreen features of the display 12 of the handheld device 10A may provide a simplified approach to controlling video editing, or other, application programs executing on the device. The handheld device 10A may include I/O ports 16 that open through the enclosure 28. These I/O ports 16 may include, for example, an audio jack and/or a Lightning® port from Apple Inc. to connect to external devices. The electronic device 10 may also be a tablet device 10B, as illustrated in FIG. 3. For example, the tablet device 10B may be a model of an iPad® available from Apple Inc.

In certain embodiments, the electronic device 10 may take the form of a computer, such as a model of a MacBook®, MacBook® Pro, MacBook Air®, iMac®, Mac® mini, or Mac Pro® available from Apple Inc. By way of example, the electronic device 10, taking the form of a notebook computer 10C, is illustrated in FIG. 4 in accordance with one embodiment of the present disclosure. The depicted computer 10C may include a display 12, input structures 14, I/O ports 16, and a enclosure 28. In one embodiment, the input structures 14 (e.g., a keyboard and/or touchpad) may be used to interact with the computer 10C, such as to start, control, or operate a GUI or applications (e.g., Final Cut Pro X®, Aperture®, or Logic Pro X® by Apple Inc.) running on the computer 10C.

With the preceding in mind, a variety of computer program products, such as applications or operating systems executing on an electronic device 10, may use or implement the techniques discussed below to enhance the user experience on the electronic device 10. Indeed, any suitable computer program product that provides for the editing and production of a time-based media may employ some or all of the techniques discussed below. For example, an electronic device 10 may store and run a video editing application (e.g., Final Cut Pro X® from Apple Inc.) or other suitable application configured to implement the present embodiments. The application may be stored as one or more executable routines (which may encode and implement the actions described below) in memory and/or storage (FIG. 1). These routines, when executed, may cause control codes and logic as discussed herein to be implemented and may cause screens as discussed herein to be displayed on a screen of the electronic device or in communication with the electronic device. While the following examples are provided in the context of a video editing application, the present approaches are suitable for use in other applications (e.g., an animation production application, a music editing application, and so forth) where time-based media may be created, edited, and produced.

Figure 5:
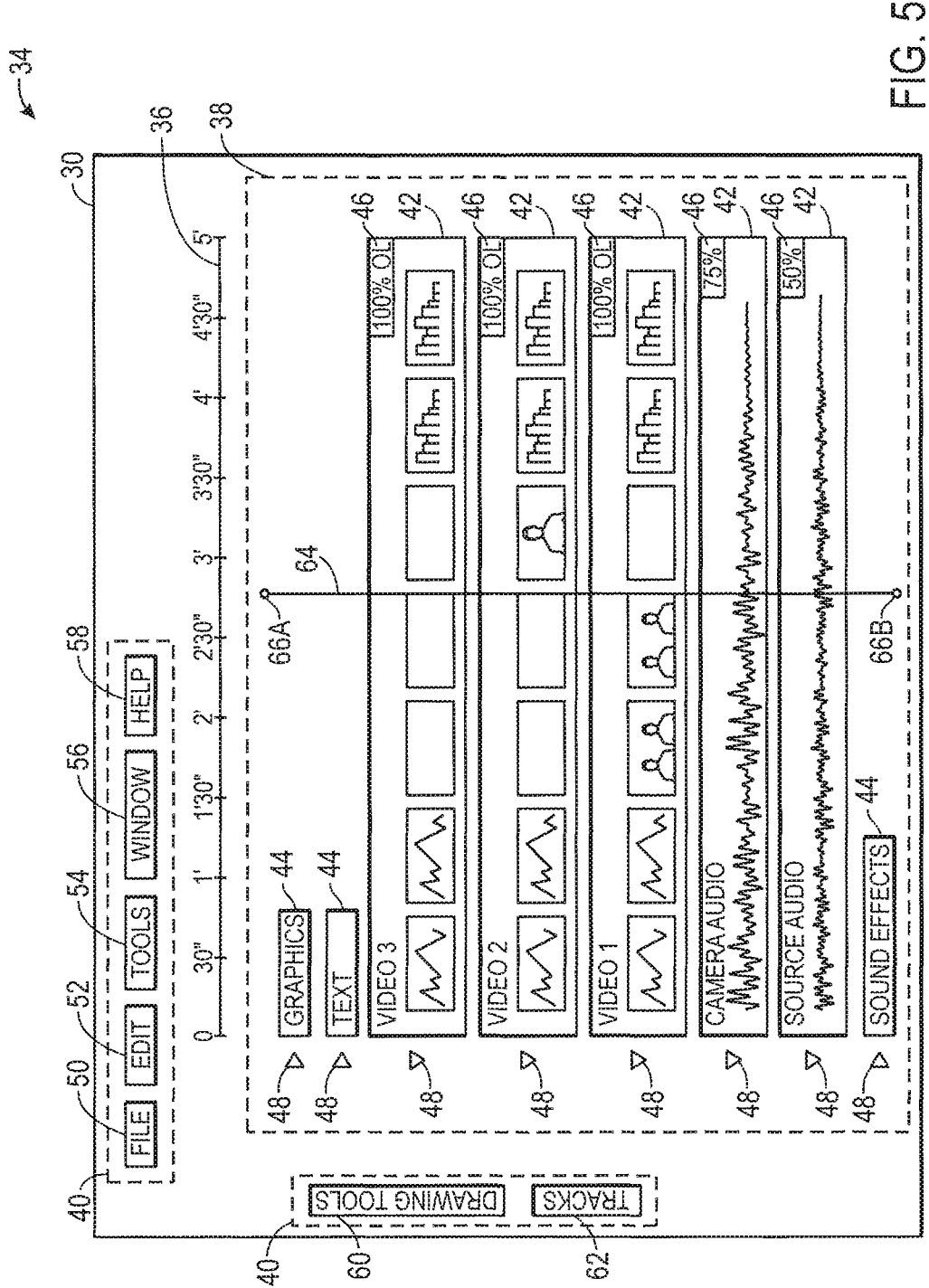
FIG. 5 illustrates a screen of a video-editing application, in accordance with an embodiment.

Turning now to FIG. 5, the GUI 30 of a video editing application 34 displays a timeline 36, the various tracks 38 that constitute a video, and a variety of menus 40. As will be appreciated, a user may determine the state of a track 38 at a particular point in time based on the timeline 36. The timeline 36 may be displayed above the tracks 38, as depicted in FIG. 5. Alternately or additionally, the timeline 36 may below the tracks 38.

Each of the tracks 38 represents a particular portion of the video. For example, the tracks 38 may include the various tracks of video, graphics, and text that will be overlaid as a single image and the various tracks of sound in a finished movie. Oftentimes, there are separate tracks 38 for each video roll (e.g., a main interview vs. a cutaway, or standard definition video vs. high definition video), each audio roll (e.g., dialogue vs. sound effects) and each presentation of an image (e.g. graphics vs. a network or program logo, or text vs. captions).

The GUI 30 includes a visual depiction 42 of each track 38 through time, as shown in FIG. 5. For example, for a video track 38, the GUI 30 may depict each frame of the video track 38 over time, and for an audio track 38, the GUI 30 may display a histogram of the audio frequency over time. The individual visual depiction 42 of each track 38 may be marked using a label 44 and may also include various indicia 46 which describe the state of the respective track 38. For example, the label 44 may include the volume level for an audio track 38 or the opacity of a video track 38.

In certain embodiments, the GUI 30 may "minimize" the visual depiction 42 of a particular track 38 based on user input, such that only the label 44 of the track 38 is visible. For example, a triangle 48 may be located near the label 44 of the track 38 that, when selected (e.g., clicked), may prompt the GUI 30 to minimize the track 38. As will be appreciated, selecting the triangle 48 again may restore the visual depiction 42 of the track 38. Alternately or additionally, a user may select the visual depiction 42 or the label 44 (e.g., right click) to generate a menu of options that include minimizing or restoring a track 38.

Further, in certain embodiments, the GUI 30 may resize the visual depiction 42 of a particular track 38 based on user input. For example, the user may hover an input structure 14 (e.g., a mouse) over the border of the visual depiction 42 to generate a cursor (e.g., an arrow) to resize the visual depiction 42. The cursor may also be generated by selecting (e.g., double clicking) a resize icon included in the visual depiction 42. Alternately or additionally, a user may select the visual depiction 42 (e.g., right click) to generate a menu of options that includes resizing the visual depiction 42.

As mentioned above, the GUI 30 includes a variety of menus 40 which may be used to edit the tracks 38, generate the final video file, and control the items displayed in the GUI 30, among other things. For instance, the GUI 30 includes a file menu 50, an edit menu 52, a tools menu 54, a window menu 56, a help menu 58, a drawing tools menu 60, and a tracks menu 62, as shown in FIG. 5.

The video editing application 34 has a preview or playback mode, which plays the most recent state of the video. As such, the preview mode allows the user to evaluate any changes to the video without making any permanent changes to the video. As will be appreciated, the GUI 30 includes a playhead 64 displayed on top of the tracks 38. The position of the playhead 64 relative to the timeline 36 indicates the point in time at which a preview of the video begins. Further, the user may change the position of the playhead 64 relative to the timeline 36 in order to change the starting point of the preview.

Although the video editing application 34 may play all tracks 38 in a preview by default, at times, it may be desirable to only preview certain tracks 38. For instance, a user may wish to view and listen to exactly one video track and one audio track to ensure that the tracks are properly synchronized.

Figure 6A:
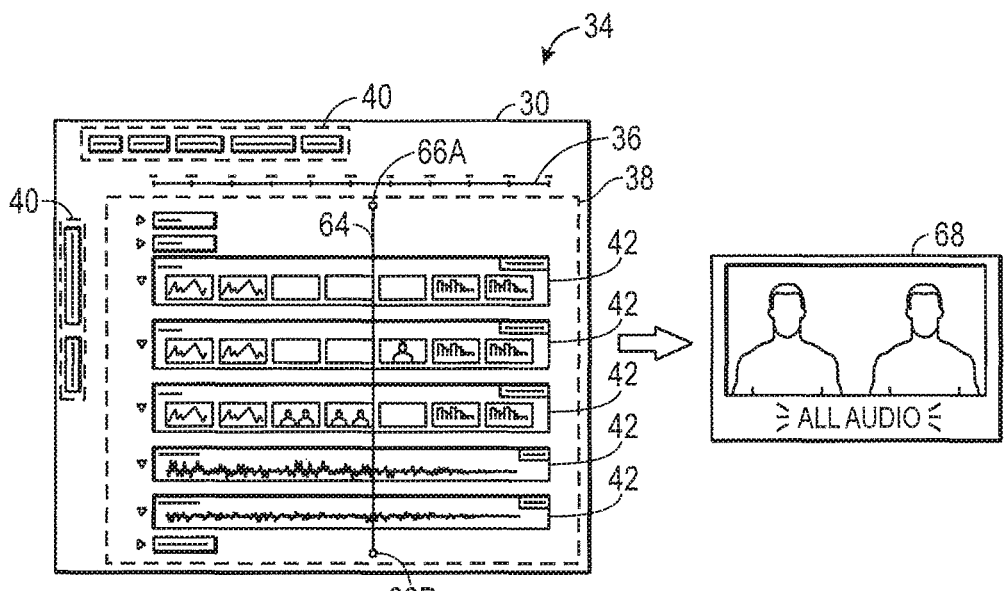
FIGS. 6A-6D illustrate examples of a preview generated by the video-editing application of FIG. 5, in accordance with an embodiment.
Figure 6B:
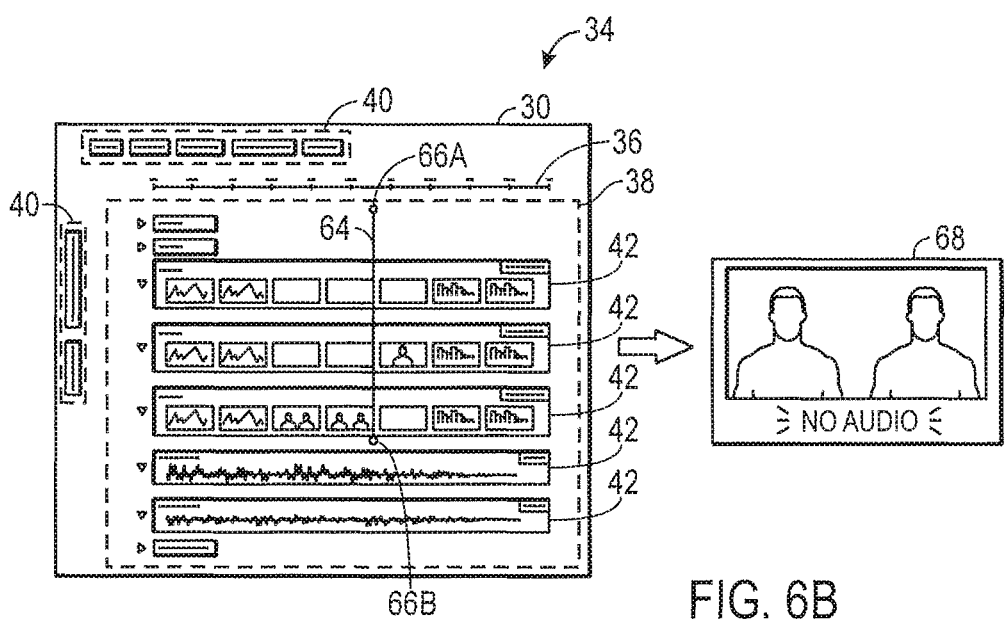
Figure 6C:
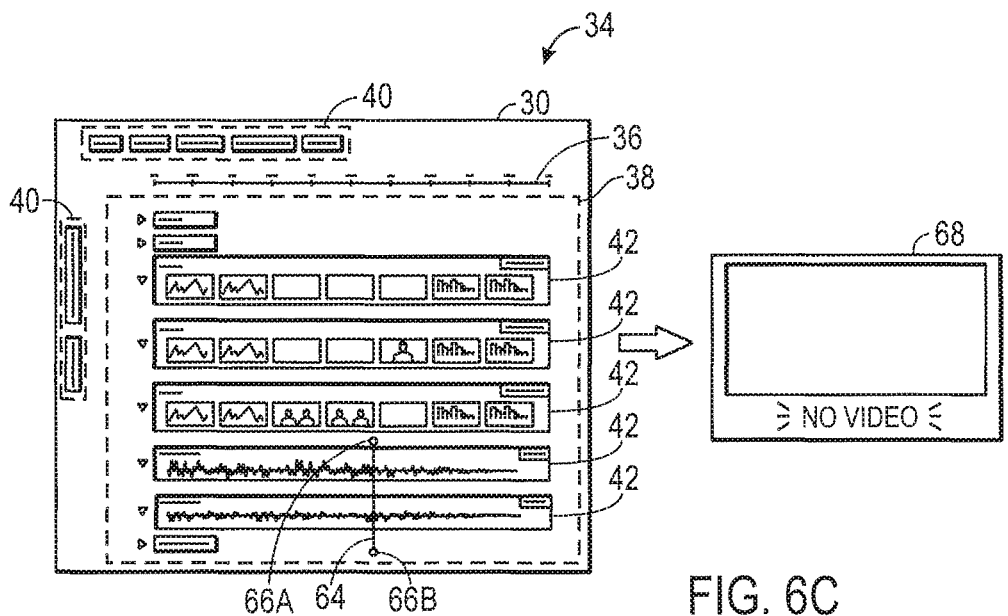
Figure 6D:
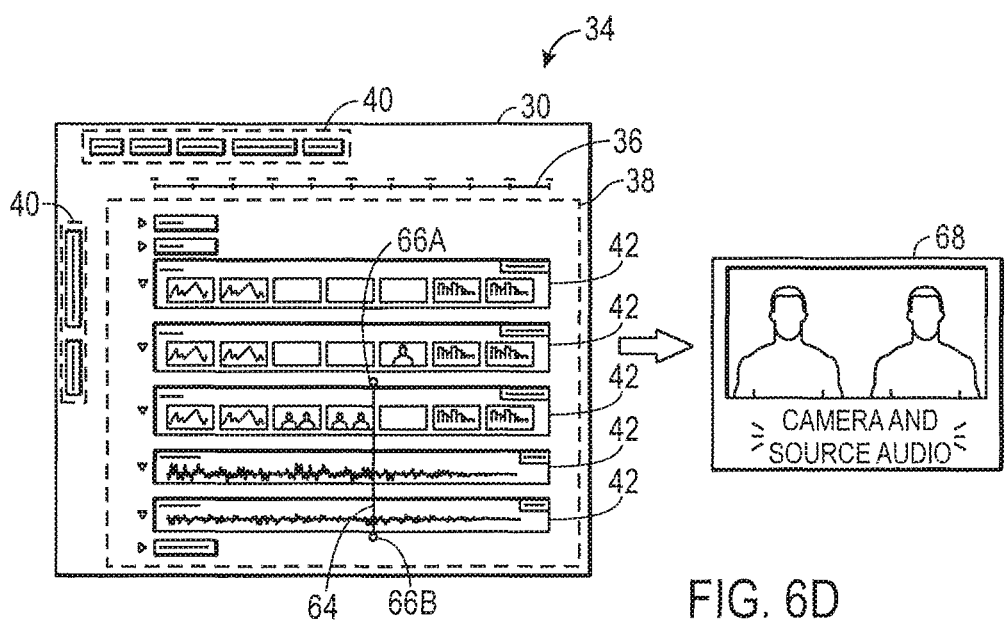

To indicate which tracks 38 should be included in the preview, the user may adjust the configuration of the playhead 64 to vertically span the desired tracks 38. As depicted in FIG. 5, the playhead 64 may have a handle 66A (e.g., circles, arrows, etc.) one end of the playhead 64 and a handle 66B at the other end of the playhead 64. To adjust the configuration of the playhead 64, the user can select and reposition the handles 66A and 66B (e.g., click and drag the handle) such that the playhead 64 vertically spans the tracks 38 the user wishes to include the preview. For example, in FIG. 6A, the playhead 64 spans all of the tracks 38, such that all of the tracks 38 are included in the corresponding preview 68, while in FIG. 6B the playhead 64 only spans the visual tracks 38, such that no audio is included in the corresponding preview 68. In another instance, as shown in FIG. 6C, the playhead 64 spans only the audio tracks 38, such that no video is included in the corresponding preview 68, while in another example shown in FIG. 6D, the playhead 64 includes a custom selection of the tracks 38 that are included in the corresponding preview 68.

Turning back to FIG. 5, in certain embodiments, the GUI 30 may not make any changes to the visual depiction 42 of the tracks 38 not included in the preview, relying solely on the playhead 64 to indicate which tracks 38 are included in the preview. In other embodiments, the GUI 30 may change the visual depiction 42 (e.g., graying or fading out the visual depiction) or may add an icon to the indicia 46 to indicate that the corresponding track 38 is not included in the preview. In still other embodiments, any tracks 38 not included in the preview may automatically be minimized as described above.

Allowing the user to select certain tracks 38 using the playhead 64 mitigates effectively "hiding" a track 38 from the preview by editing the track 38 or adding an overlay. Further, as will be appreciated, the playhead 64 is usually present within the GUI 30. As such, using the ever-present playhead 64 to select the desired tracks 38 may be less complicated than navigating the menus 40, which may be minimized or removed from the GUI 30, to accomplish the same task. Further, using the playhead 64 may allow the user to control the tracks 38 included in the preview at multiple levels of granularity (e.g., all visual tracks, all text tracks, a custom selection of tracks, etc). Accordingly, the playhead 64 may allow the user a greater freedom of operation in preview mode than other video-editing applications, which may restrict the user to including or excluding all tracks 38 of a particular type of track 38, as mentioned above.

As will be appreciated, certain embodiments of the video-editing application 34 may restrict the spatial arrangement of the visual depiction 42 of the tracks 38. For example, the GUI 30 may present the tracks 38 in a particular order that the user is unable to alter. In another instance, the user may arrange the GUI 30 to present the visual depiction 42 of the tracks 38 in a particular manner that he or she does not wish to change. However, at times, the user may wish to include in the preview tracks 38 that are not adjacent to one another in the GUI 30.

Figure 7:
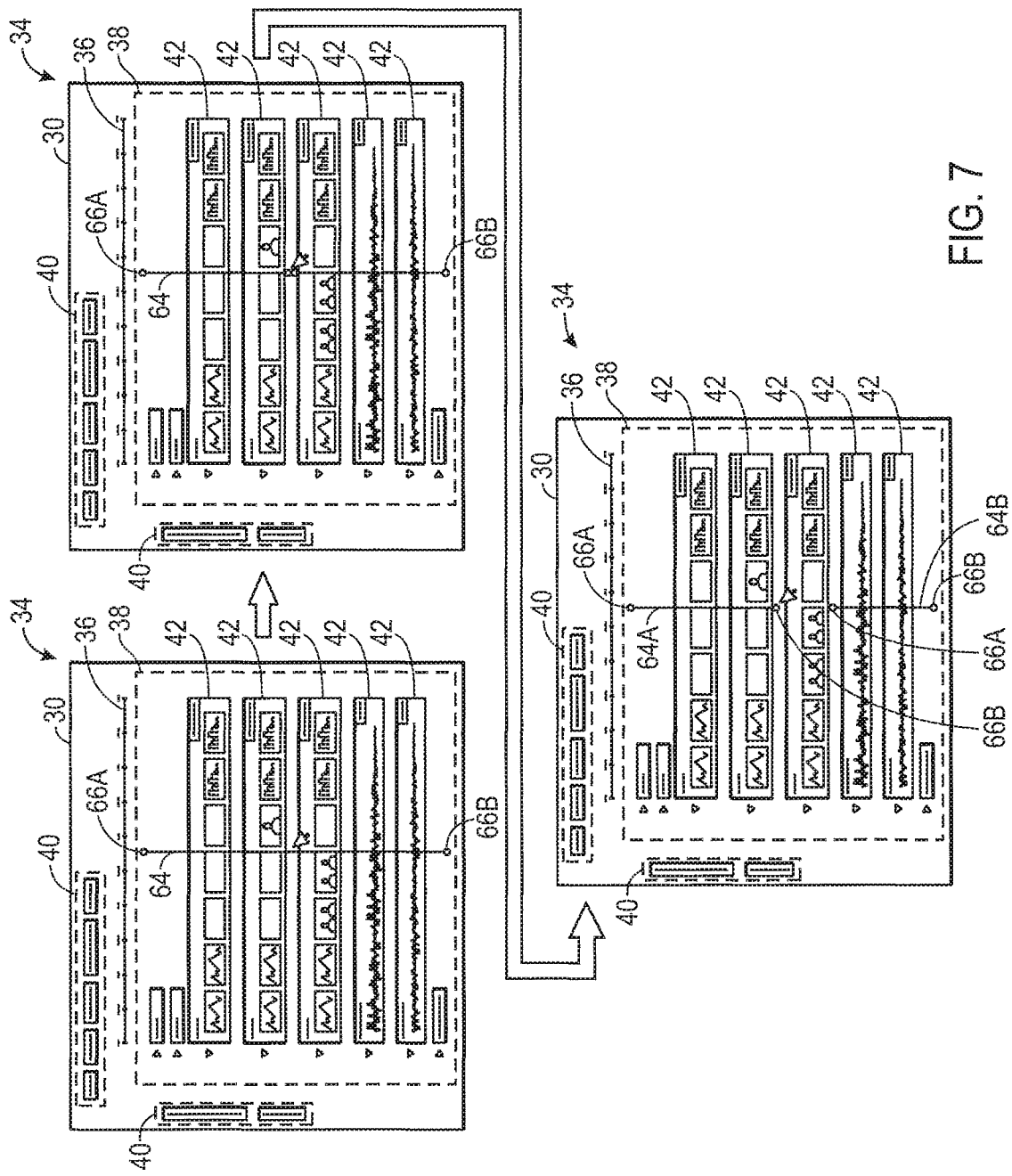
FIG. 7 illustrates generating two playheads in the video-editing application of FIG. 5, in accordance with an embodiment.

To include the non-adjacent tracks 38 in the preview, the user may create multiple playheads 64. In particular, the user may select a portion of the playhead 64 (e.g., double tapping the middle of the playhead 64), prompting the GUI 30 to generate two playheads, 64A and 64B, that together vertically span the same tracks 38 as the previous playhead 64, as shown in FIG. 7. The user may then adjust the configuration of the playheads 64 as described above to select the desired tracks for the preview.

Figure 8:
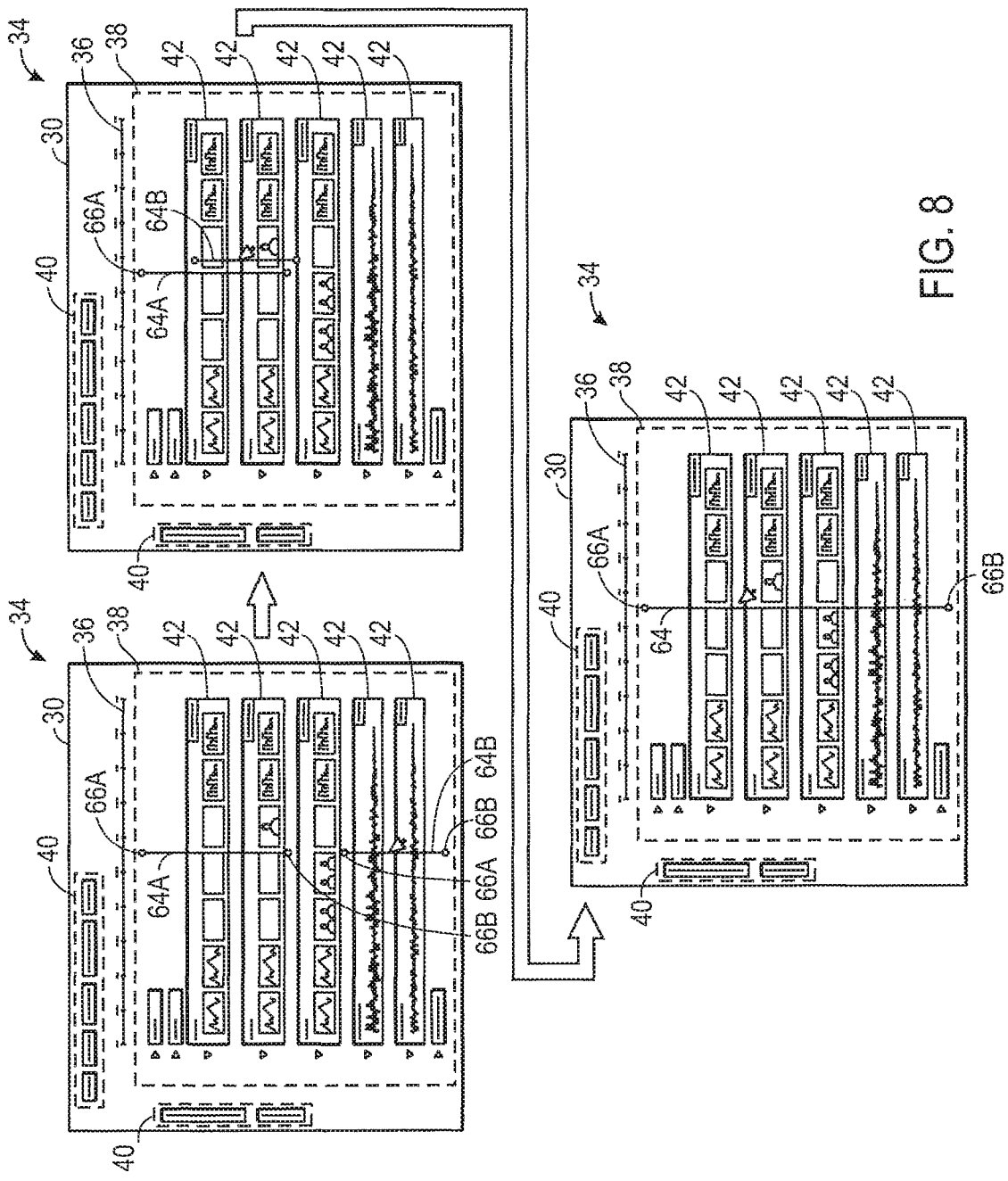
FIG. 8 illustrates rejoining the two playheads of FIG. 7, in accordance with an embodiment.
Figure 9:
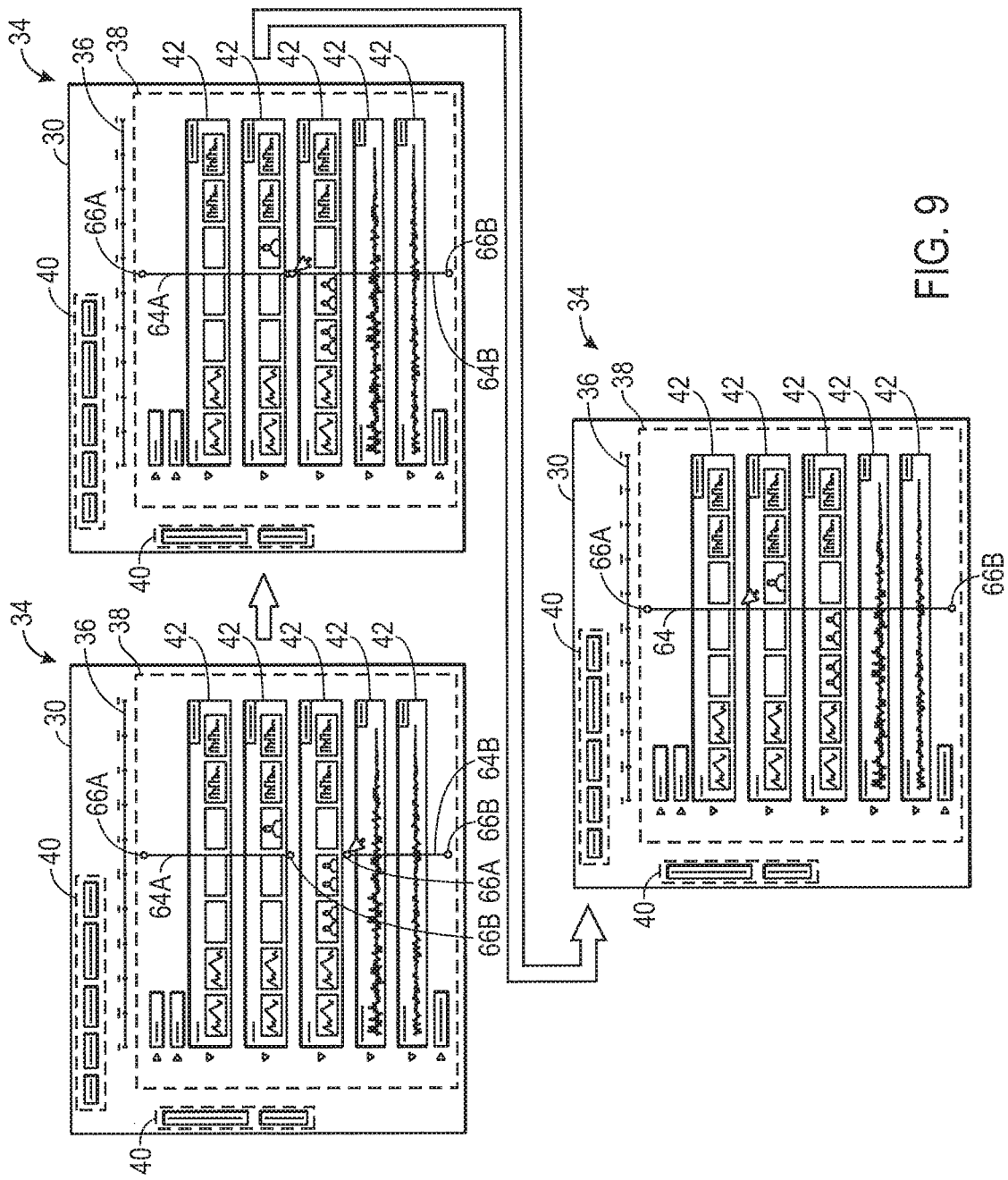
FIG. 9 illustrates rejoining the two playheads of FIG. 7, in accordance with another embodiment.

To rejoin the playheads 64A and 64B, the user may drag one playhead 64 (e.g., playhead 64B) on top of the other playhead 64 (e.g., playhead 64A) using an input structure 14, as shown in FIG. 8. This action prompts the GUI 30 to generate a single playhead 64 that vertically spans the same tracks 38 as the playheads 64A and 64B, as well as any intervening tracks 38 not originally selected by the playheads 64A and 64B. In other embodiments, the user may drag a handle 66A or 66B on one of the playheads 64 (e.g., the handle 66A on playhead 64B) on top of a handle 66A or 66B on the other playhead 64 (e.g., the handle 66B on playhead 64A), as shown in FIG. 9, to rejoin two playheads 64.

Figure 10:
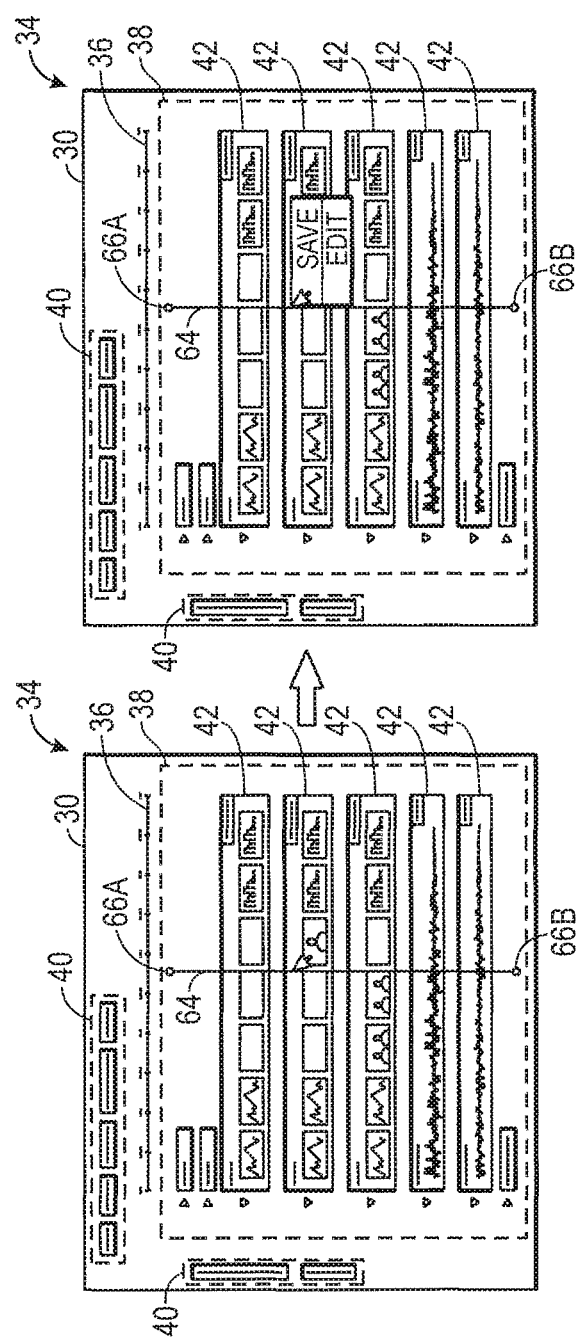
FIG. 10 illustrates performing actions in the video-editing application of FIG. 5 using a playhead, in accordance with an embodiment.

The configuration of the playhead 64 may be used by the video editing application 34 for other control and editing actions besides selecting the tracks 38 to include in a preview. For example, a user may save the tracks 38 vertically spanned by the playhead 64 as a group for later reference. To save the tracks 38 as a group, the user may select the playhead 64 (e.g., click and hold, right click, etc.), prompting the user interface to present a menu that includes an option to save the tracks 38, as shown in FIG. 10. In another example, the user may select the playhead 64 (e.g., double tap, right click) to generate a menu that includes an option to edit the tracks 38, as depicted in FIG. 10. Alternately or additionally, the user may edit the tracks 38 vertically spanned by the playhead 64 using the menus 40.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A tangible, non-transitory, machine-readable medium comprising machine-executable instructions, which, when executed by at least one processor of a machine, cause the at least one processor to:
   receive, via an input device, an adjustment to an adjustable playhead of a graphic user interface, wherein the adjustable playhead is configured to span at least one track of a plurality of tracks of time-based media;
   in response to the adjustment, change which of the plurality of tracks are spanned by the adjustable playhead; and
   play, via an output device, the at least one track spanned by the adjustable playhead without playing another track of the plurality of tracks that is not spanned by the adjustable playhead.

2. The machine-readable medium of claim 1, wherein the plurality of tracks comprises a video track, an audio track, or a combination thereof.

3. The machine-readable medium of claim 1, wherein the adjustable playhead comprises a first handle at a first end of the adjustable playhead and a second handle at a second end of the adjustable playhead, and wherein the adjustment comprises a change of position to the first handle, the second handle, or both.

4. The machine-readable medium of claim 1, wherein the adjustment comprises a user input to change which of the plurality of tracks are output.

5. The machine-readable medium of claim 1, wherein the adjustable playhead spans at least two of the plurality of tracks, and wherein the graphic user interface is configured to receive a first user input to replace the adjustable playhead with a second adjustable playhead and a third adjustable playhead that, together, span the at least two of the plurality of tracks.

6. The machine-readable medium of claim 5, wherein the graphic user interface is configured to receive a second user input to replace the second adjustable playhead and the third adjustable playhead with a fourth adjustable playhead that spans the at least two of the plurality of tracks.

7. The machine-readable medium of claim 6, wherein the second user input comprises moving a first handle of the second adjustable playhead to a position of a second handle of the third adjustable playhead.

8. The machine-readable medium of claim 1, wherein the adjustable playhead is configured to vertically span the at least one track of the plurality of tracks.

9. A system comprising:
a display configured to display a graphic user interface;
memory storing instructions to present the graphic user interface; and
a processor configured to execute the instructions to present the graphic user interface comprising:
a visualization of a plurality of tracks of time-based media;
a visualization of an adjustable playhead configured to span at least one track of the plurality of tracks; and
an affordance, selectable via an input device, to facilitate an adjustment to the adjustable playhead, wherein the adjustment is configured to change which of the plurality of tracks are spanned by the adjustable playhead, wherein only the at least one track spanned by the adjustable playhead is configured to be output via one or more output devices.

10. The system of claim 9, wherein the time-based media comprises a video, wherein the graphic user interface comprises a visual depiction of the video.

11. The system of claim 10, wherein the graphic user interface comprises a timeline displayed above the visual depiction of the video, below the visual depiction of the video, or a combination thereof, and wherein the visual depiction of the video is configured to present playback at a position in time determined by a position of the adjustable playhead relative to the timeline.

12. The system of claim 9, wherein the affordance for the adjustable playhead comprises a first handle disposed on a first end of the adjustable playhead and a second handle disposed on a second end of the adjustable playhead, and wherein the adjustable playhead is configured to be adjusted by changing a position of the first handle, the second handle, or both.

13. The system of claim 9, wherein the one or more output devices comprises the display, an audio output, or both.

14. A method, comprising:
receiving, into a processor, via an input device, an adjustment to an adjustable playhead of a graphical user interface, wherein the adjustable playhead is configured to span at least one track of a plurality of tracks of time-based media;
in response to the adjustment, using the processor to change which of the plurality of tracks are spanned by the adjustable playhead; and
outputting, by the processor, via an output device, of the plurality of tracks, only the at least one track spanned by the adjustable playhead.

15. The method of claim 14, wherein the time-based media comprises a video, an audio clip, a slide show, an image, a presentation, or any combination thereof.

16. The method of claim 14, wherein outputting only the at least one track comprises playback of the at least one track.

17. The method of claim 16, wherein after the adjustment, a track of the plurality of tracks is no longer spanned by the adjustable playhead, and wherein the method comprises removing the track from the playback.

18. The method of claim 14, wherein the adjustable playhead comprises a first portion and a second portion, wherein the first portion of the adjustable playhead spans the at least one track and the second portion of the adjustable playhead spans at least one other track, wherein the first portion and the second portion are not connected.

19. The method of claim 14, comprising:
receiving a user input to save the at least one track of the plurality of tracks as a preset; and
in response to receiving the user input, saving the at least one track of the plurality of tracks as the preset.

20. The method of claim 14, wherein the output device comprises a display, an audio output, or both.

* * * * *